United States Patent Office 3,846,160
Patented Nov. 5, 1974

3,846,160
PROCESS FOR ENHANCING THE ADHESION BETWEEN STEEL CORD AND A RUBBER COMPOUND
Hiroshi Hirakawa and Toshiyuki Sakai, Kanagawa-ken, Japan, assignors to The Yokohama Rubber Co., Ltd., Tokyo, Japan
No Drawing. Filed June 23, 1972, Ser. No. 265,752
Int. Cl. B32b 15/06; B44d 1/42
U.S. Cl. 117—79          5 Claims

ABSTRACT OF THE DISCLOSURE

A process is provided for enhancing the adhesion force between steel cord and a rubber compound, in which process a steel cord is usually stored for a period of time and incorporated as a tension member in the rubber in an atmosphere of a high humidity. The process involves applying to a zinc-plated or a copper-zinc alloy plated steel cord a mineral oil solution containing an organic acid salt of a higher aliphatic amine or a mineral oil solution containing the organic acid salt and benzotriazole or mercaptobenzothiazole, etc.

BACKGROUND OF THE INVENTION

Field of the Invention

The present invention concerns a process for preventing the deterioration of the adhesion force of a steel cord to a rubber compound in the production of rubber products, and more particularly to the pretreatment of a steel cord to be incorporated in a rubber compound before the subsequent rubber vulcanization step to achieve a satisfactory adhesion force of the steel cord to the rubber compound, when vulcanized.

It is common practice in the art to increase the strength of rubber products such as a rubber belt or a rubber tire by incorporating therein a zinc plated or a copper-zinc alloy plated steel cord (which will be referred to simply as "a steel cord" hereinafter). However, such prior art rubber-steel cord composites suffer from poor adhesion of the steel cord to the vulcanized rubber, when such a steel cord has been stored for a long period of time in a humid atmosphere prior to fabrication with the rubber. The problem is acute because the storage of the steel cord and the vulcanization of the rubber composite are usually subject to highly humid conditions.

In an attempt to avoid the problem of poor adhesion, a process has been proposed in which the steel cord is stored in and the fabricating process is conducted in a controlled atmosphere of low humidity. However, this method fails to completely eliminate the problem and requires bulky and expensive dehumidifying equipment.

SUMMARY OF THE INVENTION

It has been found that the above-noted problem of poor adhesion and related disadvantages may be overcome by the present invention.

Benzotriazole, 2-mercaptobenzothiazole, etc. are known discoloration preventive agents for copper alloys. It has recently been disclosed that effective compositions for that purpose include aqueous solutions containing organic salts of higher aliphatic amines, e.g. coconut monoamine salicylic acid salt, coconut monoamine adipic acid salt, beef tallow diamine salicylic acid salt, etc., and mineral oil solutions containing those organic salts.

It has now been discovered that such discoloration preventive agents may be used for providing good adhesion between steel cords and vulcanized rubber. It has been further discovered that the most effective compositions for such purpose include mineral oil solutions containing organic acid salts of higher aliphatic amines and mineral oil solutions containing an organic salt (or salts) of high aliphatic amines and discoloration agents such as benzotriazole.

Aqueous solutions containing organic salts of higher aliphatic amines are not as effective in providing for good adhesion between the steel cords and the rubber compound.

Accordingly, it is a principal object of the present invention to provide good adhesion between the steel cord and the rubber compound in the production of rubber products under humid conditions.

This and other objects and advantages of the present invention will become more apparent in connection with the ensuing description and appended claims.

DESCRIPTION OF THE PREFERRED EMBODIMENTS

Example 1

In this example, a zinc plated steel cord was coated with the agents listed in the following table.

Table 1

(I) Aqueous solution containing 0.5% by weight of cocoanut monoamine acetic acid salt
(II) Mineral oil [1] solution containing 0.5% by weight of cocoanut monoamine salicylic acid salt
(III) Mineral oil solution containing 0.5% by weight of beef tallow diamine salicylic acid salt
(IV) Mineral oil solution containing 0.5% by weight of the following mixture:

|   | Percent |
|---|---|
| Cocoanut monoamine acetic acid salt | 80 |
| Cocoanut monoamine salicylic acid salt | 15 |
| Benzotriazole | 5 |

(V) Aqueous solution containing 0.5% by weight of benzotriazole.

[1] No. 1 spindle oil.

The organic acid salts of higher aliphatic amines covered under the above items (I) to (IV) were prepared by mixing, with agitation, an organic acid with a higher aliphatic amine for two hours at 60° C. to suppress the formation of amide by-products. The ratio of the acid value to the salt value of such salts is about 1.0. Then, 0.5% by weight of the salt thus prepared was added to No. 1 spindle oil or water to give transparent solutions. Zinc plated wire cords, commercially available and of a type of 7 x 7 and 49 strands, were used. The steel wire had a diameter of 0.21 mm., and zinc was plated thereon to a thickness of 2 to 3 microns.

Coconut monoamine is marketed by Armour Industrial Chemical Company under the trade names Armeen C (technical grade) and Armeen CD (distilled grade). Tallow diamine is marketed by the Armour Industrial Chemical Company under the trade name Duomeen T. The Armour Company also markets the acetate salts of these amines under the trade name Armac, the acetate salt of Armeen C being designated Armac C and the acetate salt of Armeen CD being designated Armac CD.

A number of the plated steel cords were separately dipped into one of the adhesion deterioration preventive agents shown in Table 1, for 10 minutes and thereafter suspended with one end thereof clamped by suitable means, allowing the excessive solution to drip off the cords. The adhesion force was tested using a rubber compound of the composition shown in Table 2 below and according to a test method similar to that of ASTM (D-1871-61: Method A), in which steel cords are drawn from the rubber compound after the vulcanization thereof.

Table 2.—Composition of rubber compound use for adhesion tests of zinc plated steel cords

| | Parts by weight |
|---|---|
| Natural rubber | 100 |
| Carbon black | 50 |
| Zinc white | 5 |
| Stearic acid | 2 |
| Oil | 3 |
| Sulfur | 2 |
| Naphthenate cobalt | 10 |
| 2-mercaptobenzothiazole | 0.5 |

Following the conventional process, the mixture listed as above was milled by means of rollers to give a well mixed rubber compound. The results of the adhesion tests are given in Table 3 below.

TABLE 3

| | Adhesion force (kg.) (vulcanization 140° C., for 50 minutes) | |
|---|---|---|
| | High humidity treatment, none [2] | After high humidity treatment [3] |
| Adhesion deterioration preventive agent: | | |
| (I) | [4] 124(100) | 85(70) |
| (II) | 218(100) | 107(95) |
| (III) | 139(100) | 139(100) |
| (IV) | 135(100) | 139(100) |
| (V) | 133(100) | 105(90) |
| Without adhesion deterioration preventive agent | 129(100) | 60(40) |

[1] Denotes a mean value of the adhesion force for six measurements.
[2] Allowed to stand at room temperature within a silica gel desiccator.
[3] Denotes that steel cords are allowed to stay in a desiccator for three weeks, the atmosphere in the desiccator was 100% relative humidity at 38° C.
[4] The figures in parenthesis denote the percentage of the area of the rubber remaining adhered to the surface of the steel cords after being drawn, based on the total surface area of the steel cord.

Example 2

The adhesion deterioration preventive agents, the application method, and the adhesion test method were the same as in Example 1, except that copper-zinc alloy plated steel cords were used in lieu of zinc plated steel cords.

For the adhesion test, copper-zinc plated steel cords, commercially available and of a type of 5 x 7 + 3 x 1 + 1 and 39 strands were used. The diameter of the steel cords was 0.15 mm. and copper-zinc alloy (copper/zinc ratio 7/3) was plated thereon to a thickness of 0.2 to 0.5 micron. The composition of the rubber compound used for the adhesion test is given in Table 4 below.

Table 4.—Composition of rubber compound used for adhesion tests of copper-zinc alloy plated steel cords

| | Parts by weight |
|---|---|
| Natural rubber | 100 |
| Carbon black | 50 |
| Zinc white | 10 |
| Stearic acid | 2 |
| Oil | 3 |
| Sulfur | 4 |
| 2-mercaptobenzothiazole | 0.5 |

TABLE 5

[Adhesion test results]

| | Adhesion force (kg.) (vulcanization condition: at 140° C., for 50 minutes) | | | |
|---|---|---|---|---|
| | Dipping time in solution (10 seconds) | | Dipping time in solution (10 minutes) | |
| | High humidity treatment (not applied) | After high humidity treatment | High humidity treatment (not applied) | After high humidity treatment |
| Adhesion deterioration preventive agent: | | | | |
| (I) | 142 | 141 | 147 | 127 |
| (II) | 140 | 138 | 141 | 138 |
| (III) | 143 | 135 | 145 | 134 |
| (IV) | 142 | 134 | 148 | 138 |
| (V) | 149 | 135 | 148 | 120 |
| Without adhesion deterioration preventive agent | 142 | 113 | 142 | 113 |

Example 3

A series of tests were conducted varying the amount of adhesion deterioration preventive agent adhered to the steel cords. The test results are

TABLE 6

| | Adhesion force (kg.) (vulcanization condition: at 140° C., for 50 minutes) | | | |
|---|---|---|---|---|
| | Steel cords were suspended for 30 minutes to allow the solution to drip off the cord | | Immediately after dipping, the steel cords having a great amount of solution thereon were used | |
| | Zinc plated | Copper-zinc alloy plated | Zinc plated | Copper-zinc alloy plated |
| Adhesion deterioration preventive agent: | | | | |
| (II) | 130 | 138 | 130 | 138 |
| (III) | 135 | 135 | 138 | 130 |

Example 4.—Anti-humidity treatment of composite body of steel cords and unvulcanized rubber compound Steel cords were spaced 1.0 mm. apart between upper and lower unvulcanized rubber sheets, each having a thickness of 1.00 mm., and the assembly was pressed together. (The composition of the rubber compound is shown in Tables 2 and 4 with reference to zinc or copper-zinc alloy plated steel cords.)

The steel cord and rubber compound composite body obtained as above was allowed to stand in an atmosphere of a high humidiy (relative humidiy of 100%) at 38° C. for three weeks to test the effects of such conditions on the adhesive forces between the steel cords and the rubber after the vulcanization thereof and to compare the effect of treatment with adhesion deterioration preventive agent (II) of Table 1 on the adhesive force. The test results are shown in Table 7 below.

TABLE 7

[Adhesive force (kg.)]

| Treatment condition | Adhesion deterioration preventive agent (II) used | Zinc plated steel cords | | Copper-zinc alloy plated steel cords | |
|---|---|---|---|---|---|
| | | Vulcanized at 140° C. for 50 minutes | Vulcanized at 140° C. for 100 minutes | Vulcanized at 140° C. for 50 minutes | Vulcanized at 140° C. for 100 minutes |
| Room temperature treatment [1] | No | [2] 133(95) | 110(100) | 148(95) | 117(100) |
| Do | Yes | 128(100) | 113(95) | 146(90) | 117(95) |
| High humidity treatment [3] | No | 60(50) | 52(40) | 112(40) | 105(40) |
| Do | Yes | 130(100) | 109(95) | 140(90) | 116(95) |

[1] Denotes treatment in an atmosphere of a relative humidity of 25% for three weeks.
[2] Denotes the percentage of the area of a steel cord to which the rubber remained adhered, based on the total area of the steel cord, after the steel cord had been drawn from the rubber-steel composite body.
[3] Denoted treatment in an atmosphere of a relative humidity of 100% for three weeks.

Example 5.—Corrosion tests for metal-plated steel cords

A series of tests were conducted to determine the corrosion inhibiting effect for each of the compositions listed in Table 1. The results of this series of tests are listed in Table 8 below.

TABLE 8

| | Corrosion grades for steel cords placed in a high humidity atmosphere[1] | | Corrosion grades for zinc plated steel cords dipped in water (at room temperature for 13 days) | Corrosion grades for copper-zinc alloy plated steel cords dipped in water (at room temperature for 13 days) | Corroded condition for steel cords with no metal plating thereon, dipped in water (at room temperature for 3 days) |
|---|---|---|---|---|---|
| | Zinc plated steel cord | Copper-zinc alloy plated steel cord | | | |
| Type of adhesion deterioration preventive agent employed: | | | | | |
| (I) | 1 | 5 | No indication of corrosion. | Discoloration noted | Iron rusts developed throughout the surfaces of the steel cord. |
| (II) | 1 | 1 | do | No discoloration | No rust. |
| (III) | 1 | 1 | do | do | Do. |
| (IV) | 1 | 3 | do | do | Iron rust on (20%) of the total area of a steel cord. |
| (V) | 1 | 4 | do | Discoloration noted | Iron rust over the entire surface. |
| Without adhesion deterioration preventive agent. | 3 | 5 | Slight indication of corrosion. | Brown iron rust noted | Do. |

[1] Denotes the corrosion grades for steel cords allowed to stand in an atmosphere of a 100% relative humidity at 30°C for three weeks. The corrosion grade ratings are as follows:
1. no rust.
2. a small area of the surface of the steel cord is corroded.
3. discoloration and slight corrosion were observed.
4. a considerably large amount of iron rust was noted.
5. iron rust was observed substantially over the entire surface of the steel cord.

What is claimed is:

1. A process for manufacturing steel cord reinforced rubber comipirsing:
    coating steel cord with a solution comprising a mineral oil and an organic acid salt of a higher aliphatic amine, said salt being present in an amount effective to promote adhesion between the steel cord and rubber;
    forming a composite body of said coated steel cord and rubber; and
    vulcanizing said composite.

2. The process of claim 1 wherein the steel cord is plated with zinc or a copper-zinc alloy prior to said coating.

3. A process for the manufacture of steel cord reinforced rubber product comprising:
    coating steel cord with a solution comprising mineral oil and an organic acid salt of a higher aliphatic amine and a discoloration agent selected from the group consisting of 2-mercaptabenzothiazole, benzotriazole and derivatives thereof, said salt being present in an amount effective to promote adhesion between the steel cord and rubber;
    forming a composite body of said coated steel cord and rubber; and
    vulcanizing said composite.

4. The process of claim 1 wherein said mineral oil solution comprises about 0.5% by weight of a higher aliphatic amine selected from the group consisting of coconut monoamine salicylic acid salt and beef tallow diamine salicylic acid salt.

5. The process of claim 3 wherein said mineral oil solution comprises 0.5% by weight of a mixture comprising approximately 80% by weight of coconut monoamine acetic acid salt, approximately 15% by weight of coconut monoamine salicylic acid salt, and approximately 5% by weight of benzotriazole.

References Cited
UNITED STATES PATENTS

| | | | |
|---|---|---|---|
| 2,387,498 | 10/1945 | Cox | 117—79 UX |
| 3,547,764 | 12/1970 | Amerongen | 152—356 X |
| 2,792,868 | 5/1957 | Benson | 156—124 X |
| 3,265,525 | 8/1966 | Lichte | 117—75 X |
| 2,468,239 | 5/1949 | Saulino | 117—49 X |

WILLIAM D. MARTIN, Primary Examiner

H. J. GWINNEL, Assistant Examiner

U.S. Cl. X.R.

117—89, 128, 128.7; 152—356, 359; 156—124, 308, 316